March 23, 1943.  F. M. GUY  2,314,493
SHOCK ABSORBER
Filed Jan. 31, 1941
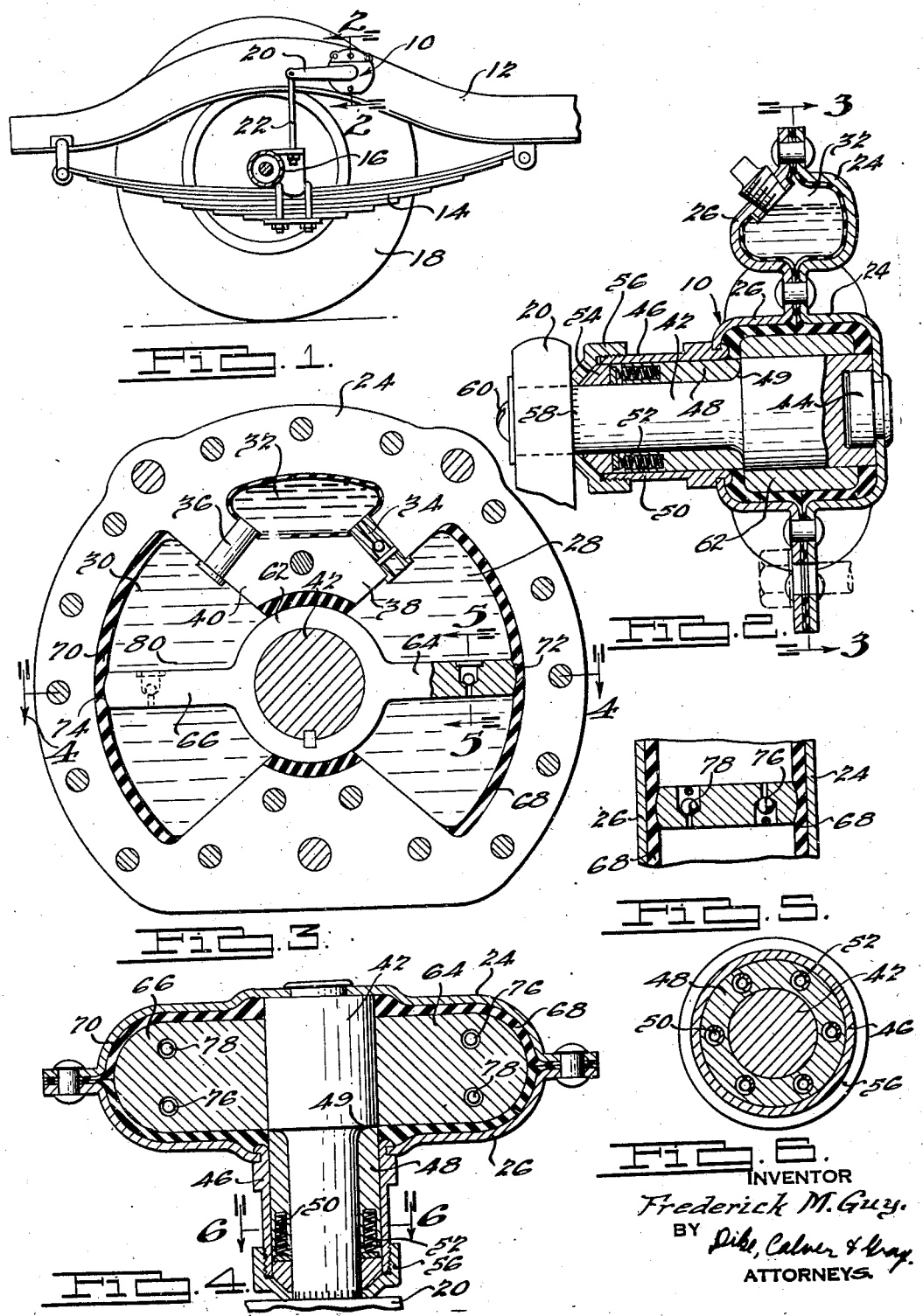
INVENTOR
Frederick M. Guy.
BY Pike, Calver & Gay
ATTORNEYS.

Patented Mar. 23, 1943

2,314,493

UNITED STATES PATENT OFFICE 2,314,493

SHOCK ABSORBER

Frederick M. Guy, Detroit, Mich., assignor to Guy and Murton, Incorporated, Detroit, Mich., a corporation of Michigan Application January 31, 1941, Serial No. 376,738

7 Claims. (Cl. 188—89)

This invention relates to power absorbing devices such for example as shock absorbers and more particularly to a novel shock absorber having positive sealing means to prevent undesirable by-passing of liquid whereupon pressure may be exerted upon a confined liquid to force the liquid through a controlled orifice thereby generating heat and dissipating or changing the form of energy.

More particularly the invention is directed to the provision of novel and improved resilient means whereby a definite and durable seal may be provided between two relatively movable members which cooperate together or with other members to form an energy transmitting or dissipating mechanism.

An object of this invention is therefore to provide a shock absorbing mechanism having a sealed chamber and a movable member having an orifice therein whereby the flow of liquid to or from the chamber may be accurately controlled.

Another object of the invention is to provide a relatively stationary member with a resilient surface of soft rubber or other suitable material vulcanized or otherwise suitably secured to the surface thereof and cooperating with a movable member engaging the resilient material and exerting a force thereon as the members move relative to each other to form an effective liquid seal.

Still a further object of the invention resides in the provision of a novel shock absorber having juxtaposed chambers separated by a movable member in such a manner that liquid may be transferred from one chamber to another through carefully metered orifices whereby the flow of liquid and thus the absorption of energy may be accurately controlled.

Another object is to provide an improved shock absorber having a pair of symmetrically disposed chambers positioned to receive the vanes of a double-vaned apertured member interposed between the chambers whereby liquid may be forced through the apertured vanes under the influence of pressure developed by movement of the vanes in the chambers, and wherein a sealed reservoir positioned adjacent said chambers is provided to compensate variations of volume of liquid due to variations of temperature.

Another object of the invention resides in the provision of a thin layer of "Duprene" or similar soft resilient material carried by the surface of one of a plurality of relatively movable members in such a manner that as the members move relative to each other the resilient material will be somewhat compressed whereupon an efficient liquid seal will be provided.

Still another object of the invention resides in the provision of flexible resilient surface material attached to one of two relatively movable members in such a manner that as the members move relative to each other the resilient material will be slightly compressed and form ripples in the resilient material which travel ahead of the movable member thereby effectively sealing the space between said movable members.

Another object is to provide a force dissipating member or shock absorber which may be readily rendered substantially inoperative by the closing of a valve communicating with an efficiently sealed chamber to substantially prevent the flow of liquid to or from said chamber thereby rendering the shock absorbing device substantially inoperative, as for example when it is desired to lock the shock absorbing devices associated with the front or steerable wheels of a motor vehicle to prevent diving or ducking of the front end of the vehicle upon application of the brakes to retard the vehicle.

Another object resides in the provision of improved support or bushing members whereby a shock absorbing device may be positioned in operative relation relative to a movable member which it is desired to control.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a side elevation partly in section of a portion of a motor vehicle embodying the present invention.

Fig. 2 is a sectional view taken substantially on the line 2—2 of Fig. 1, looking in the direction of the arrows.

Fig. 3 is a sectional view taken substantially on the line 3—3 of Fig. 2, looking in the direction of the arrows.

Fig. 4 is a sectional view taken substantially on the line 4—4 of Fig. 3, looking in the direction of the arrows.

Fig. 5 is a sectional view taken substantially on the line 5—5 of Fig. 3, looking in the direction of the arrows.

Fig. 6 is a sectional view taken substantially on the line 6—6 of Fig. 4, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

It will be understood that this invention is applicable to energy transmitting or absorbing devices wherein two relatively movable members are associated in such a manner that a fluid or liquid tight seal is desirable between them. The invention is illustrated herein as embodied in a vane type shock absorber although it will be understood that it is equally applicable to shock absorbing devices or energy transmitting devices of the telescoping type.

Referring now more particularly to Fig. 1, it will be observed that a shock absorbing device preferably of the vane type 10 is fixed to a frame member 12 of a vehicle. The frame 12 is provided with suitable resilient or spring means 14 operably connected to a wheel supporting member or axle 16 which supports a road engaging wheel 18. The shock absorber 10 and the axle 16 may be interconnected by an oscillatable arm 20 pivotally connected with the axle 16 by means of a link 22. The shock absorbing device 10 operates to retard or check oscillation of the spring 14 and to prevent undesirably frequent or undesirably long impulses from being transmitted from the axle 16 to the frame 12 of the vehicle.

The shock absorber 10 preferably comprises a pair of oppositely disposed casing members 24 and 26 which may be formed by a stamping, casting or forging operation. As more clearly illustrated in Fig. 3, the casings 24 and 26 are shaped to provide a pair of spaced arcuate shaped symmetrical fluid chambers 28 and 30 having a liquid reservoir or storage chamber 32 interposed therebetween. The reservoir 32 is interconnected with each of the chambers 28 and 30 by means of check valves 34 and 36 respectively which permit liquid to flow in one direction and by similarly formed oppositely directed check valves to permit the flow of liquid to and from the reservoir in the other direction. The check valves 34 and 36 are placed in wall portions 38 and 40 respectively interposed between the reservoir 32 and each of the arcuate shaped chambers 28 and 30 respectively.

The arm 20 is suitably fixed to a shaft 42 concentrically mounted with reference to the arcuate shaped chambers 28 and 30. The shaft 42 is provided with an apertured end portion adapted to receive a centering plug 44 carried by the casing portion 24. The casing 26 engages an axially extending hub portion 46 adapted to receive an axially disposed bushing 48 formed of brass or other suitable material between the hub 46 and the shaft 42. The bushing 48 is provided with a plurality of axially extending apertures 50 adapted to receive suitable springs 52 to yieldingly urge the bushing 48 into engagement with a collar or rounded end portion 49 of the shaft 42 and to yieldingly urge a gasket or sealing member 54 into engagement with a suitable cap 56 threaded on the end of the axially extending hub 46.

The shaft 42 is provided with a knurled end portion 58 to receive the arm 20 which may be suitably held in place by means of a plug or screw 60. The shaft 42 is provided with a hub 62 concentrically mounted with reference to the arcuate shaped chambers 28 and 30 and so positioned as to support radially extending vanes 64 and 66 respectively into the chambers 28 and 30.

Means may be provided to securely seal the space between the ends of the vanes 64 and 66 and the inner walls of the chambers 28 and 30 respectively.

One desirable form of such sealing means comprises a thin layer 68 and 70 of "Duprene" or other suitable flexible resilient material vulcanized or otherwise suitably secured to cover the entire wall area of the chambers 28 and 30. The vanes 64 and 66 have rounded end portions 72 and 74 respectively and are of suitable length to extend slightly beyond the normal outer surface of the resilient material 68 and 70 to partially compress said material.

In the operation of this device as the vanes 64 and 66 move in the arcuate shaped chambers 28 and 30 the ends 72 and 74 of the vanes 64 and 66 respectively compress or distort the resilient material 68 and 70 and cause a rippling or wrinkling of the outer surface of the flexible material as the vanes move over the resilient material thereby securely sealing the space between the vanes 64 and 66 and the walls forming the chambers 28 and 30 respectively.

Each of the vanes 64 and 66 is provided with spaced oppositely directed check valves 76 and 78 as illustrated in Fig. 4 to permit liquid to flow through the vanes as they move in the chambers.

When a shock or other force is transmitted through the spring 14 from the road engaging wheel 18 to move the frame member 12 more rapidly than is desired, the movement of the axle 16 relative to the frame 12 is resisted by the shock absorber 10. Movement of the axle 16 is transmitted through the link 22 and arm 20 to rotate the shaft 42 of the shock absorber. The rotational movement of the shaft 42 is transmitted through the hub 62 to oscillate the vanes 64 and 66 in the chambers 28 and 30 respectively.

The ends 72 and 74 of the vanes 64 and 66 engage the resilient material 68 and 70 thereby partially compressing it and causing a rippling or wrinkling of the outer surface of the resilient material as the vanes move within their respective chambers. When the vanes 64 and 66 move sufficiently to build up sufficient pressure in the liquid in the chambers 28 and 30 respectively, one of the check valves 76 or 78 will be actuated whereupon a controlled quantity of liquid passes through each of the vanes 64 and 66. It will be understood that suitable springs may be provided to maintain the valve members against actuation until subjected to substantially predetermined pressure.

The greater the shock or force transmitted through the arm 20 to oscillate the vanes 64 and 66 the greater the pressure that will be developed in the chambers 28 and 30. The higher the resulting pressure in the chambers the more rapidly the liquid will be forced through the check valves, and the more rapidly the liquid is forced through the check valves the greater the heat which will be developed and the greater the energy which will be dissipated.

It will be understood that if desired only one of the chambers 28 or 30 and its associated vane may be employed as a shock absorbing device.

I claim:

1. In a shock absorber, a cylinder having a plurality of spaced symmetrically disposed chambers, a quantity of liquid in said chambers, a concentrically disposed member having a plurality of radially extending apertured arms projecting into said chambers, check valve means in each of the arms whereby liquid may by-pass the arms in both directions, and sealing means between the ends of the arms and the walls of the chambers comprising flexible resilient material carried by said walls in such manner as to be engaged and somewhat compressed by the ends of the arms as the arms move in the chambers to dissipate energy by forcing liquid to flow through said check valves.

2. In a motor vehicle having wheel supporting means, a frame, a shock absorber carried by the frame, connecting means between the shock absorber and wheel supporting means comprising a rotatable arm carried by the shock absorber and a link hingedly connected to said arm and to the wheel supporting means, said shock absorber comprising an arcuate shaped liquid filled chamber, an arm projecting into said chamber and having check valve means whereby liquid may flow in opposite directions through the arm when subjected to substantially predetermined pressure in opposite directions, and sealing means between the end of the arm and the wall of the arcuate shaped chamber comprising flexible resilient material engaging the wall of the chamber in such a manner as to be engaged by the end of the arm to be somewhat compressed and form ripples therein to move before the end of the arm as the arm moves relative to the walls of the arcuate shaped chamber.

3. A shock absorber comprising a pair of oppositely disposed casings having symmetrically arranged substantially arcuate shaped chambers, a shaft concentrically mounted relative to said casings, means carried by each of the casings and engaging the shaft to maintain the shaft in a substantially predetermined relation relative to the casings, a hub mounted on the shaft and having radially extending arms projecting into the spaced chambers, oppositely directed check valve means in each of the arms whereby liquid may flow through the arms in opposite directions when subjected to substantially predetermined pressures, a chamber forming a reservoir formed in the casings and positioned adjacent each of said arcuate shaped chambers, check valve means extending in opposite directions between the reservoir and each of the arcuate shaped chambers, and sealing means comprising flexible resilient material carried by each of the stampings and positioned to be engaged by the ends of the arms as the arms move relative to the chambers under the influence of force exerted to rotate the shaft.

4. In a shock absorber, a pair of oppositely directed casing members, a centrally disposed shaft concentrically mounted with reference to said casing members, centering means including a plug carried by one of the casing members and projecting into an aperture formed in the shaft, an axially extending hub carried by the other of the casing members and concentrically mounted relative to the shaft, a bushing interposed between said hub and shaft, a cap surrounding the shaft and threaded on the end of the hub, a pair of symmetrically disposed arcuate shaped chambers formed in the casing members, a hub mounted on the shaft and having a plurality of radially extending apertured vanes extending into the arcuate shaped chambers, check valve means extending through the vanes in opposite directions whereby liquid may flow through the vanes in opposite directions, and sealing means between the ends of the vanes and the walls of the arcuate shaped chambers comprising flexible resilient means carried by the walls of the chambers and positioned to be engaged and somewhat compressed by movement of the ends of the vanes relative to the walls of the chambers to securely seal the space between said chambers and vanes.

5. A shock absorber comprising a pair of oppositely disposed casings having symmetrically arranged substantially arcuate shaped chambers, a shaft concentrically mounted relative to said casings, means carried by each of the casings and engaging the shaft to maintain the shaft in a substantially predetermined relation relative to the casings, a hub mounted on the shaft and having radially extending arms projecting into the spaced chambers, oppositely directed check valve means in each of the arms whereby liquid may flow through the arms in opposite directions when subjected to substantially predetermined pressures, and sealing means comprising flexible resilient material carried by each of the stampings and positioned to be engaged by the ends of the arms as the arms move relative to the chambers under the influence of force exerted to rotate the shaft.

6. In a shock absorber, a pair of oppositely directed casing members, a centrally disposed shaft concentrically mounted with reference to said casing members, means including a plug carried by one of the casing members and projecting into an aperture formed in the shaft, an axially extending hub carried by the other of the casing members and concentrically mounted relative to the shaft, a bushing interposed between said hub and shaft, a cap surrounding the shaft and threaded on the end of the hub, an arcuate shaped chamber formed in the casing members, a hub mounted on the shaft and having a radially extending apertured vane extending into the arcuate shaped chamber, check valve means extending through the vane in opposite directions whereby liquid may flow through the vane in opposite directions, and sealing means between the end of the vane and the walls of the arcuate shaped chamber comprising flexible resilient means carried by the walls of the chamber and positioned to be engaged and somewhat compressed by movement of the end of the vane relative to the walls of the chambers to securely seal the space between said chambers and vanes.

7. In a motor vehicle having wheel supporting means, a frame, a shock absorber carried by the frame, connecting means between the shock absorber and wheel supporting means comprising a rotatable arm carried by the shock absorber and a link hingedly connected to said arm and to the wheel supporting means, said shock absorber comprising a pair of oppositely disposed casings having symmetrically arranged substantially arcuate shaped chambers, a shaft concentrically mounted relative to said casings, means carried by each of the casings and engaging the shaft to maintain the shaft in a substantially predetermined relation relative to the casing, a hub mounted on the shaft and having radially extending arms projecting into the spaced chambers, oppositely directed check valve means in each of the arms whereby liquid may flow through the arms in opposite directions when subjected to substantially predetermined pressures, a chamber forming a reservoir formed in the stamping and positioned adjacent each of said arcuate shaped chamber, check valve means extending in opposite directions between the reservoir and each of the arcuate shaped chambers, and sealing means comprising flexible resilient material carried by each of the stampings and positioned to be engaged by the ends of the arms as the arms move relative to the chambers under the influence of force exerted to rotate the shaft.

FREDERICK M. GUY.